(12) United States Patent
Saito et al.

(10) Patent No.: US 7,533,474 B2
(45) Date of Patent: May 19, 2009

(54) CALIPER GAUGE

(75) Inventors: Osamu Saito, Kawasaki (JP);
Masamichi Suzuki, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 17 days.

(21) Appl. No.: 11/889,894

(22) Filed: Aug. 17, 2007

(65) Prior Publication Data
US 2008/0047158 A1   Feb. 28, 2008

(51) Int. Cl.
*G01B 5/02* (2006.01)
(52) U.S. Cl. .......................................... 33/811; 33/783
(58) Field of Classification Search .................. 33/783, 33/784, 810, 811, 812, 819, 823
See application file for complete search history.

(56) References Cited
U.S. PATENT DOCUMENTS

| | | | |
|---|---|---|---|
| 3,835,544 A * | 9/1974 | Schneider | 33/795 |
| 4,608,759 A * | 9/1986 | Bowhay | 33/796 |
| 4,873,771 A | 10/1989 | Wüst | |
| 5,102,471 A * | 4/1992 | Sasaki | 33/819 |
| 5,483,751 A | 1/1996 | Kodato | |
| 2003/0047009 A1* | 3/2003 | Webb | 73/862.541 |
| 2008/0184582 A1* | 8/2008 | Kim | 33/784 |

FOREIGN PATENT DOCUMENTS

| | | |
|---|---|---|
| DE | 35 27 661 A1 | 2/1986 |
| DE | 43 29 325 A1 | 3/1994 |
| EP | 0 287 506 A2 | 10/1988 |
| GB | 661643 | 11/1951 |
| JP | A 6-185905 | 7/1994 |
| JP | A 9-49721 | 2/1997 |
| JP | A 2000-155001 | 6/2000 |

\* cited by examiner

*Primary Examiner*—G. Bradley Bennett
(74) *Attorney, Agent, or Firm*—Oliff & Berridge, PLC

(57) ABSTRACT

A caliper gauge (1) includes a feeding mechanism (12) that moves a slider (11) along a main scale (10), in which the feeding mechanism (12) includes: an outer roller (121); an inner roller (122) provided in a manner rotatable around a rotary axis of the outer roller (121) to be in contact with the main scale (10); and a constant-pressure unit (123) that transmits the rotation of the outer roller (121) to the inner roller (122) and allows free rotation of the outer roller (121) relative to the inner roller (122) when more than a predetermined load is applied on the inner roller (122), the constant-pressure unit (123) including: saw-toothed projections provided on an inner circumference of the outer roller (121); and a plate spring fixed on an outer circumference of the inner roller (122) at a midsection thereof and contacted with the saw-toothed projections of the outer roller (121) on both ends thereof.

8 Claims, 4 Drawing Sheets

CALIPER GAUGE

BACKGROUND OF THE INVENTION

1. Field of the Invention

The present invention relates to a caliper gauge. More specifically, the present invention relates to a caliper gauge that holds an object to be measured with a constant measuring force.

2. Description of Related Art

A caliper gauge includes a main scale having a first measuring jaw, a slider having a second jaw, the slider movably provided on the main body relative to the main body, and a display unit that displays the displacement of the slider relative to the main body.

In order to measure an object, the main scale is gripped by one hand and the slider is moved along the main scale while applying thumb on the slider to bring inside or outside jaws provided on the main scale and the slider into contact with target portions of the object to be measured. The dimension and the like of the object can be measured by the value displayed on the display unit.

In such a caliper gauge, measuring force applied when the measuring jaws hold the object is sometimes of critical issue. The main scale and the object may be deformed on account of applied pressure. Especially, when the object is made of soft material such as rubber and plastic, the object is greatly deformed, which results in variation of measured value in accordance with difference in the measuring force, thereby rendering accurate measurement difficult.

Accordingly, various mechanisms have been proposed for keeping constant measuring force. For instance, a document (JP-A-6-185905) discloses a caliper gauge, in which a slider is moved along a main scale by rotating a pressing roller having a constant-pressure mechanism to avoid excessive measuring force.

In the above document, the pressing roller includes an outer roller provided on the slider, an inner roller having an outer periphery to be in contact with the main scale, and the constant-pressure mechanism that allows free rotation of the outer roller relative to the inner roller when more than a predetermined resistance force is applied on the inner roller.

When the outer roller is rotated, the rotation of the outer roller is transmitted to the inner roller through the constant-pressure mechanism. The inner roller is rotated while being in contact with the main scale, so that the slider is moved along the main scale. When the measuring jaws are in contact with the object, further movement of the slider is restricted and the outer roller is freely rotated relative to the inner roller. Excessive measuring force is thus avoided.

However, there is, for instance, the following problem in the caliper gauge of the above document.

The constant-pressure mechanism shown in the embodiment of the above document is a ratchet mechanism having a combination of a ratchet wheel and a coned disc spring. Though the ratchet mechanism keeps a constant measuring force against the rotation of the pressing roller in one direction, the measuring force cannot be kept constant against the reverse rotation. Accordingly, the above caliper gauge only keeps constant measuring force during a measurement using only one of the inner and the outer measuring jaws.

SUMMARY OF THE INVENTION

An object of the present invention is to provide a caliper gauge capable of keeping constant measuring force irrespective of which one of inside and outside measuring jaws is used during measurement process.

A caliper gauge according to an aspect of the present invention includes: a main scale having a first measuring jaw; a slider movable relative to the main scale and provided with a second measuring jaw that is abutted to target portions of an object to be measured together with the first measuring jaw, a display unit that displays a displacement of the slider relative to the main scale; and a feeding mechanism provided on the slider to move the slider along the main scale, the feeding mechanism including: an outer roller provided on the slider in a manner rotatable around an axis perpendicular to the moving direction of the slider; an inner roller provided on the slider in a manner rotatable around a rotary axis of the outer roller to be in contact with the main scale; and a constant-pressure unit that interconnects the outer roller and the inner roller to transmit the rotation of the outer roller to the inner roller and allows free rotation of the outer roller relative to the inner roller when more than a predetermined load is applied on the inner roller, the constant-pressure unit including: saw-toothed projections provided on an inner circumference of the outer roller; a plate spring provided on the outer circumference of the inner roller at a midsection thereof and contacted with the saw-toothed projections of the outer roller on both ends thereof.

According to the present invention, the constant-pressure unit includes the saw-toothed projections provided on the inner circumference of the outer roller; the plate spring provided on the outer circumference of the inner roller at the midsection thereof and contacted with the saw-toothed projections of the outer roller on both ends thereof. Accordingly, an end of the plate spring interconnects the outer roller and the inner roller when the outer roller is rotated in one direction to transmit the rotation of the outer roller to the inner roller and allows free rotation of the outer roller relative to the inner roller when more than a predetermined load is applied on the inner roller. Further, the other end of the plate spring interconnects the outer roller and the inner roller against the rotation of the outer roller in the other direction to transmit the rotation of the outer roller to the inner roller and allows free rotation of the outer roller relative to the inner roller when more than a predetermined load is applied on the inner roller. Accordingly, constant measuring force can be kept irrespective of which of the outside measuring jaws and the inside measuring jaws are used, thus achieving highly accurate measurement.

In the above aspect of the invention, a support unit that interconnects the slider and the feeding mechanism and supports the feeding mechanism in a manner movable toward and away from the main scale and a biasing unit that biases the feeding mechanism in a direction away from the main scale are preferably provided.

According to the above arrangement, the feeding mechanism is supported by the support unit in a manner movable toward and away from the main scale and is biased in a direction away from the main scale by the biasing unit. Accordingly, since the feeding mechanism is usually supported at a position remote from the main scale, the slider can be (coarsely) moved directly with one hand without employing the feeding mechanism. Further, the slider can be (minutely) moved via the feeding mechanism when the feeding mechanism is pressed in a direction against the biasing unit to bring the feeding mechanism into contact with the main scale, thus keeping the constant measuring force by the constant-pressure unit.

In the above aspect of the invention, the support unit is preferably an elongated component having an end rotatably secured to an end of the slider opposite to a side on which the second measuring jaw is provided and the other end on which the feeding mechanism is provided, and an outer circumference of the inner roller is preferably in contact with an end of the main scale.

According to the above arrangement, in the same manner as an ordinary caliper gauge, the main scale is gripped with one hand and the slider is moved along the main scale while applying thumb on the slider. Further, the slider can be minutely moved via the feeding mechanism by pressing the feeding mechanism to bring the feeding mechanism into contact with the main scale as necessary, thus keeping the constant measuring force. Accordingly, highly accurate measurement can be achieved without impairing operation feeling of a usual caliper gauge.

DETAILED DESCRIPTION OF PREFERRED EMBODIMENTS(S)

An embodiment of the present invention will be described below with reference to the attached drawings.

Figure 1:
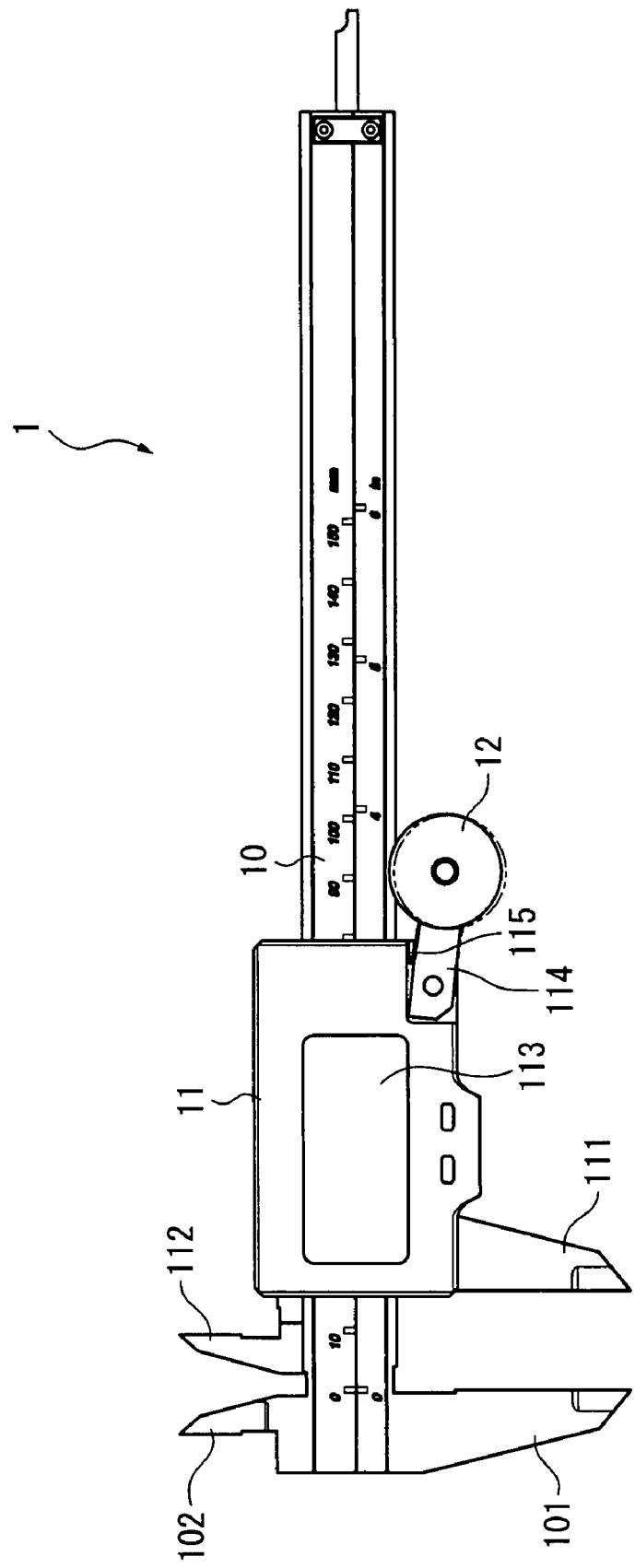
FIG. 1 is a front elevational view of a caliper gauge according to an embodiment of the invention.

As shown in FIG. 1, the caliper gauge 1 according to the present embodiment includes a main scale 10, a slider 11 movably provided to the main scale 10, a display unit 113 for displaying the displacement of the slider 11 relative to the main scale 10, and a feeding mechanism 12 that moves the slider 11 along the main scale 10.

The main scale 10 is provided with an outside measuring jaw 101 and an inside measuring jaw 102 on a longitudinal end thereof.

The slider 11 includes an outside measuring jaw 111 and an inside measuring jaw 112, a display unit 113, a support unit 114 that supports the feeding mechanism 12 in a manner movable toward and away from the main scale 10, and a biasing unit 115 that biases the support unit 114 in a direction for the feeding mechanism 12 to be away from the main scale 10.

The outside measuring jaw 111 and the inside measuring jaw 112 are provided on an end the slider 11, which are brought into contact with the target portions of an object to be measured together with the outside measuring jaw 101 and the inside measuring jaw 102 of the main scale 10.

The display unit 113 displays the displacement of the slider 11 relative to the main scale 10, which is detected by an encoder (not shown) provided between the slider 11 and the main scale 10.

Figure 2:
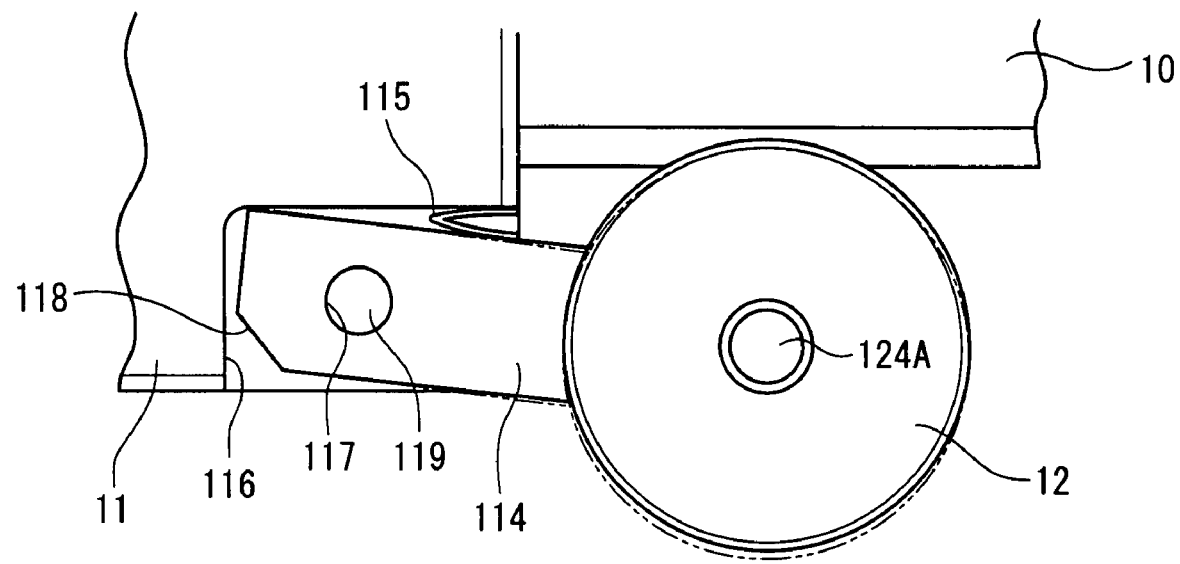
FIG. 2 is an enlarged view of the caliper gauge around a support unit according to the embodiment.

FIG. 2 shows an enlarged view of a portion around the feeding mechanism 12.

The support unit 114 is an elongated component. An end of the support unit 114 is rotatably secured to an end of the slider 11 opposite to the side on which the outside measuring jaw 111 and the inside measuring jaw 112 are provided, and the feeding mechanism 12 is provided on the other end of the support unit 114.

A hole 117 drilled perpendicular to a surface of the main scale 10 and a cut portion 118 obliquely cut relative to longitudinal direction of the support unit 114 are provided on an end of the support unit 14 near the slider 11. On the other hand, a fixing portion 116 (a cutout of substantially rectangular parallelepiped) that houses and fixes the support unit 114 and a fixing shaft 119 that is provided on the fixing portion 116 to extend in a direction perpendicular to the surface of the main scale 10 are provided on a front side of an end opposing to the inside measuring jaw 112 of the slider 11. The fixing shaft 119 of the fixing portion 116 is inserted into a hole 117 of the support unit 114. Accordingly, the support unit 114 is rotatably fixed on the end of the slider 11.

Incidentally, the cut portion 118 is provided in order to ensure rotation range of the support unit 114. The support unit 114 is rotatable within a range from a position at which the feeding mechanism 12 is in contact with the main scale 12 to a position at which the end of the support unit 114 near the slider 11 is in contact with the wall surface of the fixing portion 116.

The biasing unit 115 is a dogleg plate spring provided between the fixing portion 116 of the slider 116 and the support unit 114, which biases the support unit 114 in a direction for the feeding mechanism 12 provided on the support unit 114 to be away from the main scale 10.

Figure 3:
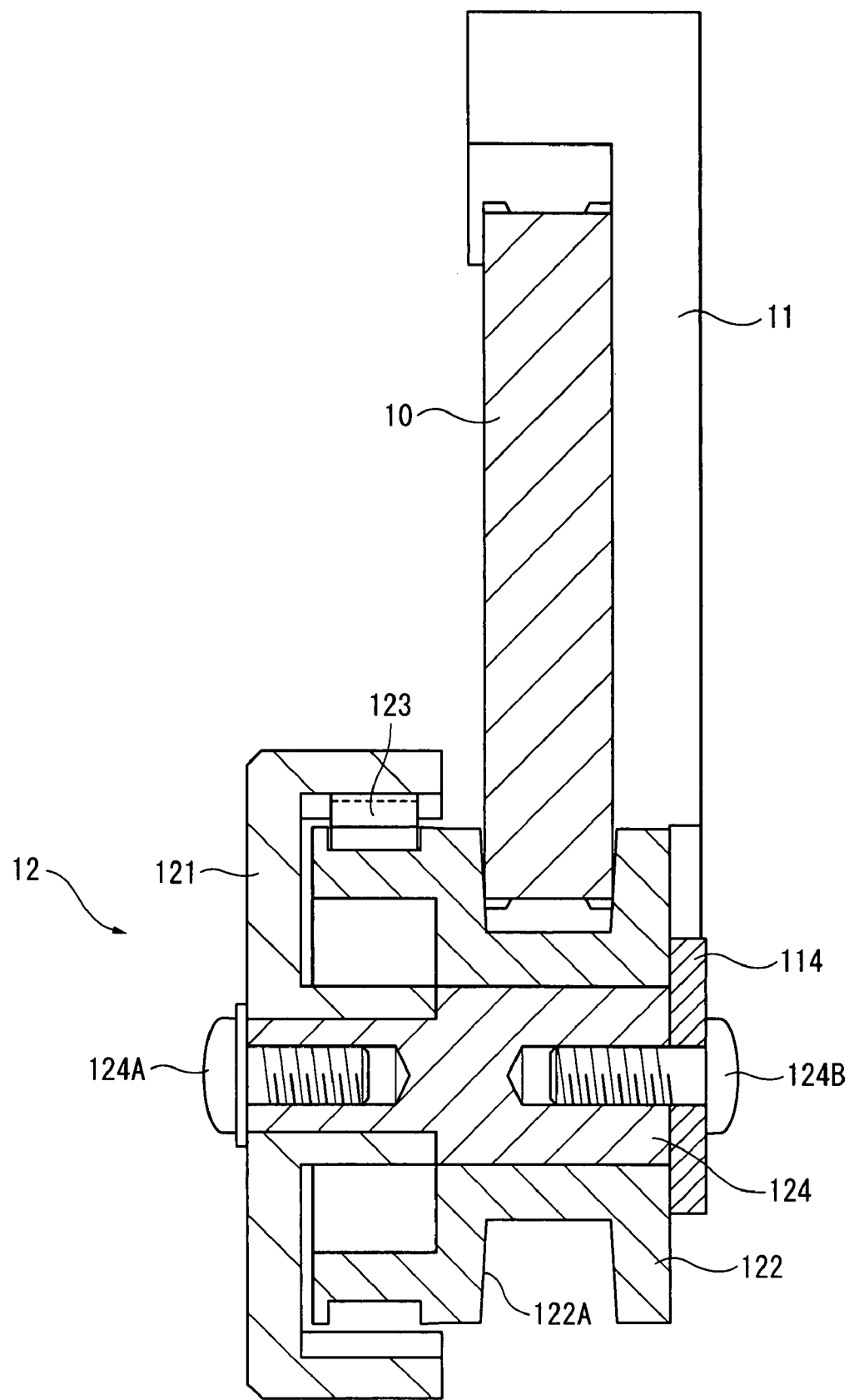
FIG. 3 is a lateral cross section of a feeding mechanism of the caliper gauge of the embodiment.
Figure 4:
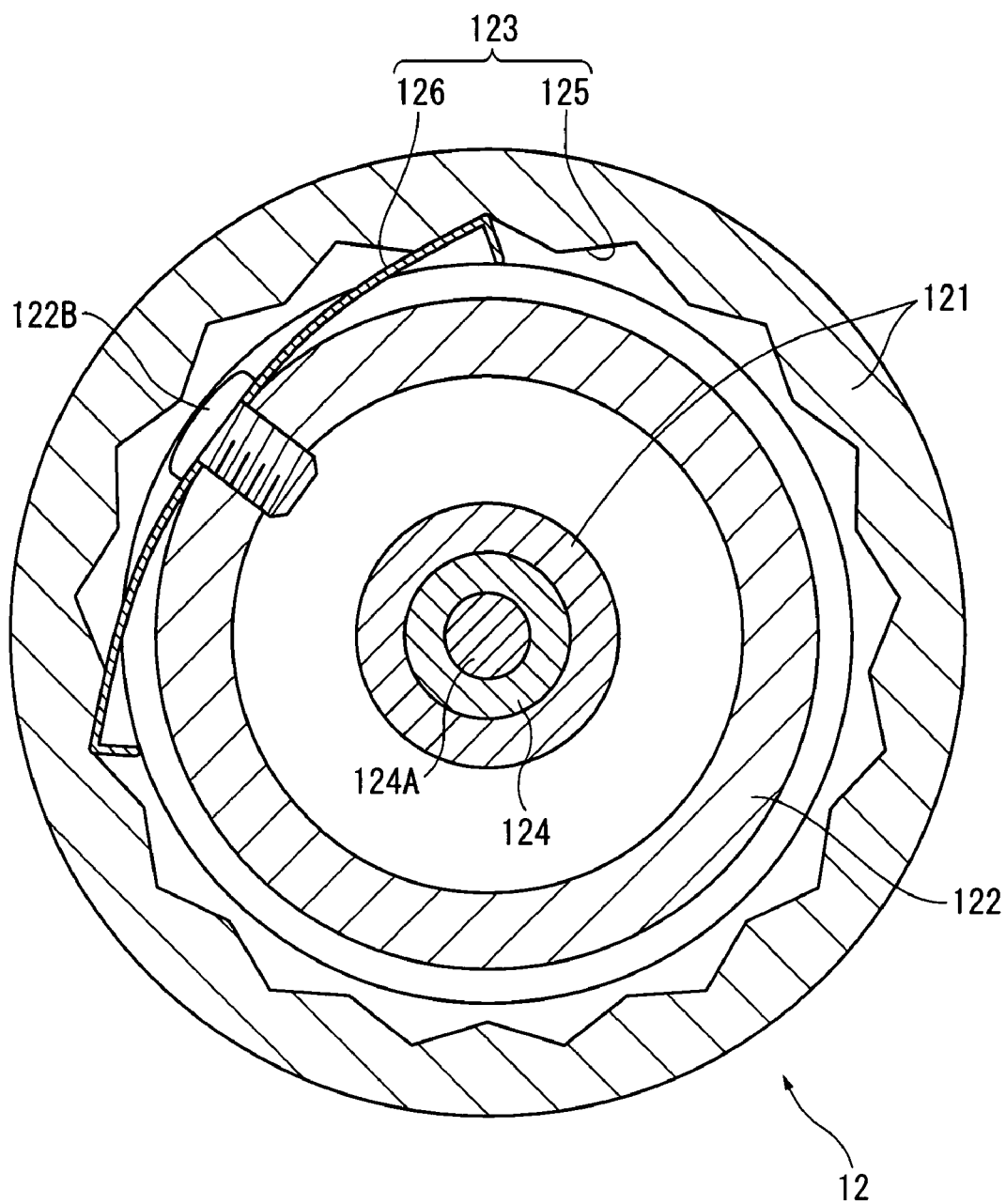
FIG. 4 is a front cross section of the feeding mechanism of the caliper gauge of the embodiment.

FIG. 3 shows a lateral cross section of the feeding mechanism 12 and FIG. 4 shows a front cross section of the feeding mechanism 12.

The feeding mechanism 12 includes an outer roller 121 that is rotatably provided around an axis perpendicular to the moving direction of the slider 11, an inner roller 122 that is rotatably provided around a rotary axis of the outer roller 121 and is brought into contact with the main scale 10, and a constant-pressure unit 123 that connects the outer roller 121 and the inner roller 122 to transmit the rotation of the outer roller 121 to the inner roller 122 while allowing free rotation of the outer roller 121 relative to the inner roller 122 when more than a predetermined load is applied on the inner roller 122.

The outer roller 121 is a substantially cylindrical component rotatably supported by a cylindrical shaft 124 having a small-diameter section and a large-diameter section at the small-diameter section with a screw 124A. The large-diameter section of the shaft 124 is unrotatably supported by the support unit 114 with a screw 124B.

The inner roller 122 is a cylindrical component having a large-diameter section and a small-diameter section on the inner circumference thereof. The large-diameter section of the shaft 124 is inserted into the small-diameter section of the inner roller 122. Accordingly, the inner roller 122 is rotatably supported by the shaft 124. A circumferential groove 122A is provided on the outer circumference of the small-diameter section of the inner roller 122. The groove 122A is configured so that the width thereof is narrowed toward the axis of the inner roller 122. Accordingly, by pressing the feeding mechanism 12 onto the main scale 10, the groove 122A is brought into rigid contact with the lower end of the main scale 10, thus allowing secure movement of the slider 11 in accordance with the rotation of the inner roller 122.

The constant-pressure mechanism 123 includes sawtoothed projections 125 provided on the inner circumference of the outer roller 121 and a plate spring 126 fixed on the outer circumference of the inner roller 122 at a midsection thereof and abutted on the saw-toothed projections 125 of the outer roller 121 on both ends thereof.

The saw-toothed projections 125 are provided on the inner circumference of the outer roller 121 in a manner that the distance from the top of one of the projections to the bottom of recesses on both sides becomes equal.

The midsection of the plate spring 126 is fixed on the outer circumference of the large-diameter section of the inner roller 122 by a screw 122B and both of the ends thereof are abutted on the saw-toothed projections 125 of the outer roller 121.

An operation for measuring a dimension of an object with the use of the caliper gauge 1 will be described below.

The main scale 10 is gripped with one hand and the slider 11 is moved along the main scale 10 while applying thumb on the slider 11. When the outside measuring jaws 101 and 111 or the inside measuring jaws 102 and 112 provided on the main scale 10 and the slider 11 are moved to a position a little before touching a target portion of the object, the feeding mechanism 12 is pressed in a direction against the biasing unit 115 to bring the feeding mechanism 12 into contact with the main scale 10. The feeding mechanism 12 is rotated with thumb to minutely move the slider 11 along the main scale 10 to bring the outside measuring jaws 101 and 111 or the inside measuring jaws 102 and 112 into contact with the target portion of the object. Then, since the slider 11 is unable to move further, the plate spring 126 allows free rotation of the outer roller 121 relative to the inner roller 122 to keep constant measuring force for holding the object. The dimension between the target portions can be measured by the indicated value on the display unit 113.

According to the present embodiment, following advantages can be obtained.

(1) An end of the plate spring 126 interconnects the outer roller 121 and the inner roller 122 against the rotation of the outer roller 121 in one direction to transmit the rotation of the outer roller 121 to the inner roller 122 while allowing free rotation of the outer roller 121 relative to the inner roller 122 when more than a predetermined load is applied on the inner roller 122. Further, the other end of the plate spring 126 interconnects the outer roller 121 and the inner roller 122 against the rotation of the outer roller 121 in the other direction to transmit the rotation of the outer roller 121 to the inner roller 122 while allowing free rotation of the outer roller 121 relative to the inner roller 122 when more than a predetermined load is applied on the inner roller 122. Accordingly, constant measuring force can be kept irrespective of which of the outside measuring jaws 101 and 111 and the inside measuring jaws 102 and 112 are used, thus achieving highly accurate measurement.

(2) The feeding mechanism 12 is supported by the support unit 114 in a manner movable toward and away from the main scale 10 and is biased in a direction away from the main scale 10 by the biasing unit 115. Accordingly, since the feeding mechanism 12 is usually supported at a position spaced apart from the main scale 10, the slider 11 can be coarsely moved directly with one hand without employing the feeding mechanism 12. Further, the slider 11 can be minutely moved via the feeding mechanism 12 when the feeding mechanism 12 is pressed in a direction against the biasing unit 115 to bring the feeding mechanism 12 into contact with the main scale 10, thus keeping the constant measuring force by the constant-pressure unit 123.

(3) In the same manner as an ordinary caliper gauge 1, the main scale 10 is gripped with one hand and the slider 11 is moved along the main scale 10 while applying thumb on the slider 11. Further, the slider 11 can be minutely moved via the feeding mechanism 12 by pressing the feeding mechanism 12 to bring the feeding mechanism 12 into contact with the main scale 10 as necessary, thus keeping constant measuring force. Accordingly, highly accurate measurement can be achieved without impairing operation feeling of a usual caliper gauge 1.

(4) Since the rotatable range of the support unit 114 is restricted, the feeding mechanism 12 does not project from the lower side of the slider 11 during regular usage, so that the presence of the feeding mechanism 12 does not obstruct the coarse movement of the slider 11.

(5) In an ordinary constant-pressure unit in which an end of a plate spring is secured by a screw and the other end is brought into contact with a saw-toothed projection, a second plate spring has to be provided on the opposite side of the first plate spring in order to balance the inner roller. In the present embodiment, since the midsection of the plate spring 126 is fixed on the outer circumference of the large-diameter section of the inner roller 122 by the screw 122B and both of the ends of the plate spring 126 are abutted on the saw-toothed projections 125 of the outer roller 121, the inner roller 122 can be balanced with a single plate spring 126. Further, the constant-pressure unit 123 can exhibit the advantage in both of the normal and reverse rotations.

(6) Since the saw-toothed projections 125 are arranged so that the distance from the top of the projections to the bottom on both sides becomes equal, the measuring force with the outside measuring jaws 101 and 111 and the measuring force with the inside measuring jaws 102 and 112 can be equalized.

(7) The measuring force can be easily changed by altering the shape of the projecting portion of the saw-toothed projections 125.

Incidentally, the scope of the present invention is not limited to the above embodiment, but includes other arrangement as long as an object of the present invention can be achieved, which includes the following modifications and the like.

(i) The saw-toothed projections 125 may not be provided. In this case, the rotation of the outer roller 121 is transmitted to the inner roller 122 only by the frictional force between the plate spring 126 and the outer roller 121. Since the saw-toothed projections 125 engaging with the plate spring 126 are not provided and the outer roller 121 starts free rotation with a weak force, the measuring force becomes considerably small. Such small measuring force is suitably employed for measuring an object of a material that is susceptible to deformation on account of pressure.

(ii) The disposition of the feeding mechanism 12 and the support unit 114 is not limited to that in the above embodiment. For instance, in FIG. 1, the support unit 114 may be provided on the upper right side of the slider 11 and the feeding mechanism 12 may be in contact with the upper end of the main scale 10. According to the above arrangement, though the slider 11 is minutely moved by operating the feeding mechanism 12 with an index finger and the like, constant measuring force can be kept and highly accurate measurement is possible in the same manner as the caliper gauge 1 of the above embodiment.

(iii) Any mechanism may be used as the biasing unit 115 as long as the feeding mechanism 12 is biased away from the main scale 10, which is not limited to the plate spring mentioned in the above embodiment. For instance, a helical spring may be suitably used.

(iv) The caliper gauge 1 is not limited to digital caliper gauge mentioned in the above embodiment. For instance, the caliper gauge may be a vernier scale caliper gauge or a dial caliper gauge.

The priority application Number JP 2006-227775 upon which this patent application is based is hereby incorporated by reference.

What is claimed is:

1. A caliper gauge, comprising:
   a main scale having a first measuring jaw;
   a slider movable relative to the main scale and provided with a second measuring jaw that is abutted to target portions of an object to be measured together with the first measuring jaw;
   a display unit that displays a displacement of the slider relative to the main scale;
   a feeding mechanism provided on the slider to move the slider along the main scale, the feeding mechanism including:
     an outer roller provided on the slider in a manner rotatable around an axis perpendicular to the moving direction of the slider,
     an inner roller provided on the slider in a manner rotatable around a rotary axis of the outer roller to be in contact with the main scale, and
     a constant-pressure unit that interconnects the outer roller and the inner roller to transmit the rotation of the outer roller to the inner roller and allows free rotation of the outer roller relative to the inner roller when more than a predetermined load is applied on the inner roller, the constant-pressure unit including:
       saw-toothed projections provided on an inner circumference of the outer roller, and
       a plate spring provided on the outer circumference of the inner roller at a midsection thereof and contacted with the saw-toothed projections of the outer roller on both ends thereof, the both ends extending from a gap between the outer roller and the inner roller in a circumferential direction of the outer roller and the inner roller;
   a support unit that interconnects the slider and the feeding mechanism and supports the feeding mechanism in a manner movable toward and away from the main scale; and
   a biasing unit that biases the feeding mechanism in a direction away from the main scale.

2. The caliper gauge according to claim 1,
   wherein the support unit is an elongated component having a first end rotatably secured to an end of the slider located opposite to a side on which the second measuring jaw is provided and a second end on which the feeding mechanism is provided, and
   an outer circumference of the inner roller is in contact with an end of the main scale.

3. A caliper gauge, comprising:
   an elongated main scale having a first measuring jaw;
   a slider disposed at, and that moves along a direction of elongation of, the main scale, the slider having a second measuring jaw that opposes the first measuring jaw of the main scale;
   a display unit that displays a distance separating the first and second measuring jaws; and
   a feeding mechanism connected to the slider and capable of moving the slider along the main scale, the feeding mechanism including:
     an outer roller having an inner circumference defining a plurality of saw-toothed projections,
     an inner roller that is concentric with the outer roller and that contacts the main scale, and
     a constant pressure unit that contacts the inner and outer rollers, the constant pressure unit including an elongated plate spring, a midpoint of the plate spring being rigidly connected to the inner roller, opposing end sections of the plate spring contacting at least two of the plurality of saw-toothed projections of the outer roller, the at least two saw-toothed projections being spaced from each other in a circumferential direction of the outer roller.

4. The caliper according to claim 3, the opposing end sections of the plate spring each being substantially L-shaped and defining a tip end, an elongated portion of each of the opposing end sections being spaced from the tip end and contacting at least one of the projections.

5. The caliper according to claim 4, the plurality of saw-toothed projections being of substantially uniform shape and size.

6. The caliper according to claim 5, further including a screw, the midpoint of the plate spring being rigidly connected to the inner roller by the screw.

7. The caliper according to claim 3, further including a support unit, the feeding mechanism being connected to the slider by the support unit so as to enable the feeding mechanism to be movable toward and away from the main scale.

8. The caliper according to claim 7, further including a biasing unit disposed between the support unit and the slider that biases the feeding mechanism away from the main scale.

* * * * *